United States Patent
Purvis et al.

(10) Patent No.: US 8,001,807 B2
(45) Date of Patent: *Aug. 23, 2011

(54) PALLADIUM SCREENS FOR BUSHING ASSEMBLY AND METHOD OF USING

(75) Inventors: David F. Purvis, Newark, OH (US); Byron L. Bemis, Newark, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/724,447

(22) Filed: Mar. 15, 2007

(65) Prior Publication Data

US 2008/0141726 A1 Jun. 19, 2008

Related U.S. Application Data

(63) Continuation-in-part of application No. 11/638,757, filed on Dec. 14, 2006.

(51) Int. Cl.
*C03B 37/075* (2006.01)
*C03B 37/095* (2006.01)
(52) U.S. Cl. .................. 65/493; 65/492; 65/374.12
(58) Field of Classification Search ............ 65/492–493
See application file for complete search history.

(56) References Cited

U.S. PATENT DOCUMENTS

| | | | |
|---|---|---|---|
| 1,986,575 A | 1/1935 | Honiss | |
| 2,360,373 A | 10/1944 | Tiede | |
| 2,460,547 A | 2/1949 | Stevens | |
| 2,482,299 A | 9/1949 | Stevens | |
| 3,164,458 A | 1/1965 | Mitchell | |
| 3,264,076 A | 8/1966 | Veazie et al. | |
| 3,401,536 A | 9/1968 | Glaser | |
| 3,488,172 A * | 1/1970 | Aliotta et al. | 65/493 |
| 3,556,753 A | 1/1971 | Glaser | |
| 3,622,289 A | 11/1971 | Hansen et al. | |
| 3,779,728 A | 12/1973 | Hansen et al. | |
| 3,810,741 A | 5/1974 | Stalego | |
| 3,837,823 A | 9/1974 | Shealy | |
| 3,840,358 A | 10/1974 | Whitfield | |
| 3,988,135 A | 10/1976 | Coggin, Jr. | |
| 4,014,692 A | 3/1977 | Costin | |

(Continued)

FOREIGN PATENT DOCUMENTS

CA 632507 12/1961

(Continued)

OTHER PUBLICATIONS

International Search Report and Written Opinion from PCT/FR05/50217 dated Nov. 8, 2005.

(Continued)

*Primary Examiner* — Matthew J Daniels
*Assistant Examiner* — Jodi Cohen
(74) *Attorney, Agent, or Firm* — Calfee, Halter & Griswold LLP

(57) ABSTRACT

A filament forming apparatus has a bushing that includes a high palladium content screen along with structural components and non-structural components. The structural components are formed of a first material having a high creep strength and the ability to withstand corrosive effects of molten mineral materials. The non-structural components are formed of at least a second material that is different from the first material.

53 Claims, 2 Drawing Sheets

U.S. PATENT DOCUMENTS

| | | | |
|---|---|---|---|
| 4,140,507 A | 2/1979 | Costin et al. |
| 4,146,373 A | 3/1979 | Sullivan et al. |
| 4,155,731 A | 5/1979 | Byrnes et al. |
| 4,264,348 A | 4/1981 | Sullivan |
| 4,274,852 A | 6/1981 | McGarry |
| 4,316,458 A | 2/1982 | Hammerton-Fraser |
| 4,436,541 A | 3/1984 | Pellegrin et al. |
| 4,488,891 A | 12/1984 | Grubken et al. |
| 4,516,995 A | 5/1985 | Bhatti et al. |
| 4,525,433 A | 6/1985 | Heywood |
| 4,537,609 A | 8/1985 | McEathron |
| 4,559,072 A | 12/1985 | Harcuba |
| 4,612,027 A | 9/1986 | Marra |
| 4,624,693 A | 11/1986 | Babbitt et al. |
| 4,650,508 A | 3/1987 | Dunn et al. |
| 4,664,688 A | 5/1987 | Grubka et al. |
| 4,752,938 A | 6/1988 | Palmquist |
| 4,846,865 A | 7/1989 | Hinze |
| 5,075,076 A | 12/1991 | Guerlet et al. |
| 5,147,431 A | 9/1992 | Gaertner |
| 5,739,933 A | 4/1998 | Dembeck et al. |
| 5,879,427 A | 3/1999 | Palamara |
| 5,928,402 A | 7/1999 | Mirth |
| 5,935,291 A | 8/1999 | Kim et al. |
| 6,044,666 A | 4/2000 | Burger et al. |
| 6,221,506 B1 | 4/2001 | Guerlet et al. |
| 6,272,887 B1 | 8/2001 | Sullivan et al. |
| 6,701,754 B2 | 3/2004 | Sullivan et al. |
| 6,779,366 B2 | 8/2004 | Bemis et al. |
| 6,813,909 B2 | 11/2004 | Bemis et al. |
| 7,003,986 B2 | 2/2006 | Hanna |
| 2003/0167802 A1* | 9/2003 | Hanna et al. .................... 65/499 |
| 2003/0177793 A1* | 9/2003 | Kock et al. ...................... 65/384 |
| 2003/0205067 A1 | 11/2003 | Arterburn |
| 2003/0221462 A1 | 12/2003 | Sullivan et al. |
| 2005/0092031 A1 | 5/2005 | Johnson |
| 2006/0065022 A1 | 3/2006 | Sullivan et al. |
| 2007/0227195 A1 | 10/2007 | Renaudin |
| 2008/0141727 A1 | 6/2008 | Sullivan |
| 2008/0223082 A1 | 9/2008 | Harms |

FOREIGN PATENT DOCUMENTS

| | | |
|---|---|---|
| GB | 1421141 | 1/1976 |
| GB | 14211142 | 1/1976 |
| JP | 1-290535 | 11/1989 |
| JP | 11-079779 | 2/1997 |
| SU | 562518 | 6/1977 |
| SU | 610808 | 11/1978 |
| SU | 998399 | 2/1983 |
| SU | 1710528 | 2/1992 |
| WO | 03/020655 | 3/2003 |
| WO | 2005/113462 | 12/2005 |
| WO | 2008/076362 | 6/2008 |
| WO | 2008/112969 | 9/2008 |
| WO | 2008/112982 | 9/2008 |

OTHER PUBLICATIONS

International Search Report and Written Opinion from PCT/US07/25610 dated May 27, 2008.
International Search Report and Written Opinion from PCT/US08/56988 dated Aug. 6, 2008.
International Search Report and Written Opinion from PCT/US08/57018 dated Jun. 27, 2008.
Office action from U.S. Appl. No. 11/568,617 dated Aug. 6, 2008.
Interview Summary from U.S. Appl. No. 11/568,617 dated Sep. 4, 2008.
Office action from U.S. Appl. No. 11/568,617 dated Feb. 23, 2009.
Notice of Abandonment from U.S. Appl. No. 11/568,617 dated Sep. 3, 2009.
Office action from U.S. Appl. No. 11/638,757 dated Aug. 21, 2008.
Office action from U.S. Appl. No. 11/638,757 dated Jan. 21, 2009.
Office action from U.S. Appl. No. 11/638,757 dated Aug. 5, 2009.
Office action from U.S. Appl. No. 11/638,757 dated Mar. 4, 2010.
Office action from U.S. Appl. No. 11/638,757 dated Jul. 23, 2010.
Office action from U.S. Appl. No. 11/638,757 dated Feb. 3, 2011.
Office action from U.S. Appl. No. 11/724,451 dated Jun. 23, 2010.
Notice of Allowance from U.S. Appl. No. 11/724,451 dated Dec. 28, 2010.
Communication from European Application No. 07862925.0 dated Oct. 8, 2010.
Communication from European Application No. 08732216.0 dated Apr. 6, 2010.
Reinacher, G., "Short time creep of platinum alloys-7, (Beitrag zur Kurzzeit-standfestigkeit von Platin-Werkstoffen)", Metallwissenschaft and Technik/METALL, Jul. 1971, pp. 740-748, Dr.-Ing. G. Reinacher, Hanau.
Communication from European Application No. 08732231.9 dated Jun. 4, 2010.
Office action from U.S. Appl. No. 08/905,496 dated Apr. 13, 1998.
Office action from U.S. Appl. No. 08/905,496 dated Oct. 21, 1998.
Interview Summary from U.S. Appl. No. 08/905,496 dated Nov. 9, 1998.
Interview Summary from U.S. Appl. No. 08/905,496 dated Jan. 19, 1999.
Interview Summary from U.S. Appl. No. 08/905,496 dated Jan. 20, 1999.
Advisory Action from U.S. Appl. No. 08/905,496 dated Jan. 26, 1999.
Notice of Allowance from U.S. Appl. No. 08/905,496 dated Feb. 12, 1999.
Supplemental Notice of Allowance from U.S. Appl. No. 08/905,496 dated Mar. 8, 1999.
Notice of Allowance from U.S. Appl. No. 11/724,451 dated Apr. 13, 2011.
Office action from Brazilian Application No. PI98114948 dated Feb. 21, 2006.
Search Report from French Application No. 405310 dated Sep. 27, 2004.
Office action from Japanese Application No. 2000-505098 dated Apr. 7, 2008.
Office action from Japanese Application No. 2000-505098 dated Nov. 25, 2008.
Office action from Japanese Application No. 2002-127315 dated Jan. 8, 2008.
Office action from Japanese Application No. 2002-127315 dated Apr. 8, 2008.
Office action from Japanese Application No. 2002-127315 dated Nov. 18, 2008.
Office action from Korean Application No. 2000-7000949 dated Jul. 8, 2005.
Office action from Korean Application No. 2000-7000949 dated Dec. 14, 2005.
Communication from Mexican Application No. 00/01230 dated Nov. 10, 2003.
Office action from Taiwanese Application No. 87111897 dated Nov. 8, 1999.
Office action from Taiwanese Application No. 87111897 dated Sep. 27, 2001.
Office action from Taiwanese Application No. 87111897 dated Sep. 9, 2002.

* cited by examiner

PALLADIUM SCREENS FOR BUSHING ASSEMBLY AND METHOD OF USING

CROSS-REFERENCE TO RELATED APPLICATIONS

This is a continuation-in-part of Ser. No. 11/638,757 filed Dec. 14, 2006.

TECHNICAL FIELD AND INDUSTRIAL APPLICABILITY OF THE INVENTION

This invention relates generally to an apparatus for and method of producing continuous filaments, and in particular, to a bushing assembly in a filament forming apparatus. The invention is useful in the production of continuous glass and mineral filaments.

BACKGROUND OF THE INVENTION

Fibrous products have been manufactured for many years using precious metal bushings, or feeders. Such feeders include a perforated bottom plate, or wall, commonly referred to in the art as a tip plate, which retains a pool of molten mineral material. Streams of molten mineral material issue from the openings, or tips, in the bottom bushing wall. By suitable means the streams of material are then attenuated and collected in the form of fibers.

The material feeders, or bushings, must be chemically resistant to the action of molten mineral material and must be dimensionally stable at high operating temperatures. Currently, such bushings are manufactured from elemental precious metals or binary alloys, such as, for example, Pt or Pt—Rh alloys. Precious metals are very expensive. If bushings could be formed with smaller amounts of such precious metals or could be formed with less expensive materials, a tremendous economic advantage would be realized.

Another difficulty also encountered in the use of precious metal bushings stems from the fact that, after a period of time, precious metal bushings tend to creep or deform in service. Such creep or deformation adversely affects the quality of the fibers. The deformation requires the bushing to be removed from service earlier than if only the corrosive and erosive effects of the material had taken their toll on the bushing. Since the precious metal feeders have a limited life, there is a need in the art to provide for bushings that have an improved operating life.

SUMMARY OF THE INVENTION

In one aspect, a filament forming apparatus has a bushing assembly with a perforated bottom tip plate, opposing end plates, opposing sidewalls and a screen. The screen is positioned adjacent to the sidewalls and the end walls, and molten mineral material flows through the screen. The bushing assembly has both structural components and non-structural components. In certain embodiments, the structural components include the perforated bottom tip plate, and optionally, at least lower portions of the opposing sidewalls. The structural components are formed of a first material that has at least a high creep strength. The non-structural components are formed of at least a second material that has at least a lower creep strength than the first material.

In certain embodiments, the structural components are formed of a first material having a high creep strength and the ability to withstand corrosive effects of molten mineral materials, such as glass. In certain embodiments, the structural components include at least a lower portion of the sidewalls and the perforated bottom tip plate. The first material can comprise Pt, a Pt alloy, or a dispersion strengthened Pt base alloy.

The non-structural components are formed of at least a second material that may be different from the first material. The screen is comprised of a third material that is a high palladium content material.

In certain embodiments, the non-structural components include at least an upper portion of the end plates. In certain non-limiting embodiments, the material can comprise: about 0 to about 100% Pd, about 0 to about 100% Pt, about 40% or less Rh, about 10% or less Ru, and about 10% or less Ir. In certain embodiments, the second material comprises about 40 to about 50% Pd, about 40 to about 50% Pt, and about 5 to about 15% Rh. In certain other embodiments, the second material comprises about 45 to about 50% Pd, about 45 to about 50% Pt and about 5 to about 15% Rh.

Also, in certain embodiments, the non-structural components can further include one or more terminal ears and at least a lower portion of the end plates, wherein the terminal ears and the lower portions of the end plates comprise a fourth material different from the first, second and third materials.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings.

DETAILED DESCRIPTION AND PREFERRED EMBODIMENTS OF THE INVENTION

Described herein is a filament forming apparatus for producing molten mineral materials, such as glass fibers and mineral fibers. The apparatus is useful with any material that can be formed into fibers. For ease of discussion herein, the filaments will be generally referred to as glass fibers or filaments. Also conventional and well-known techniques are not illustrated. The bushing configuration is, obviously, only a general illustration and any configuration commonly employed in the art will be satisfactory.

The bushing may be either a remelt bushing or a direct-melt bushing. A remelt bushing melts cold glass in the form of marbles or other shapes in its upper section and then conditions the glass and passes it through the bushing nozzles from which the molten glass is attenuated. A direct-melt bushing is supplied with liquid glass at the desired temperature from a continuous supply flowing above the bushing in a channel called a forehearth. The direct-melt bushing only needs to condition the molten glass to a uniform temperature before it is attenuated.

Figure 1:
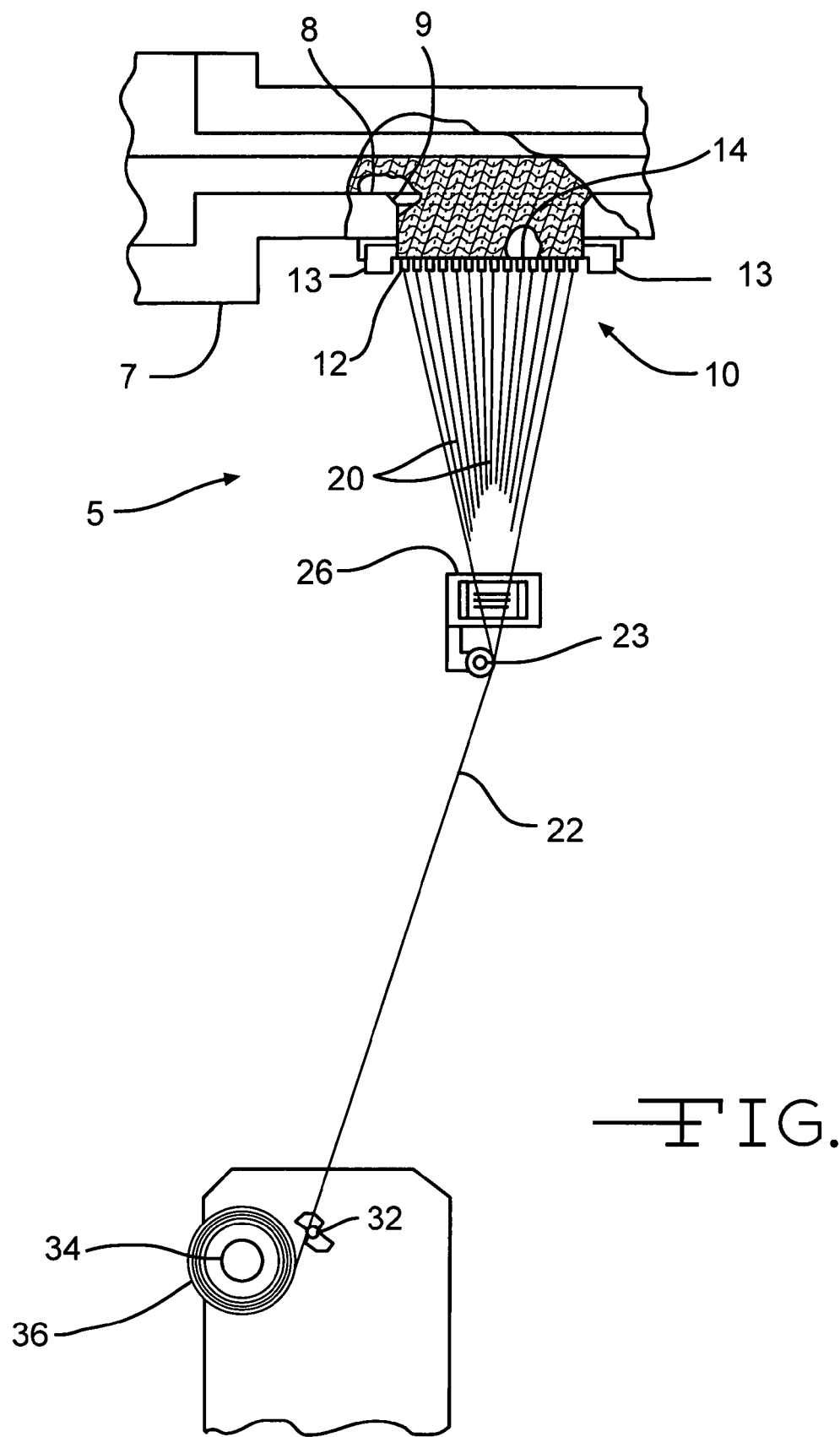
FIG. 1 is a schematic elevational view, partially in cross-section, of a portion of a direct melt fiberglass forming apparatus having a bushing assembly.

One example of a filament forming apparatus 5 having a furnace 7 and a forehearth 8 is shown in FIG. 1. An electrically heated bushing assembly 10 is located below and open to the forehearth 8 that receives refined, heat-softened or molten glass from the melting furnace 7. The bushing assembly 10 is mounted in communication with an opening, or throat, 9 in the bottom of the forehearth 8.

The bushing assembly 10 is typically electrically heated and, for this purpose, suitable terminals 13 (for example, diametrically opposed terminal ears 13) are provided. The terminal ears 13 are attached to a suitable source of power, not shown, whereby electric current is passed through the bushing assembly 10.

Figure 2:
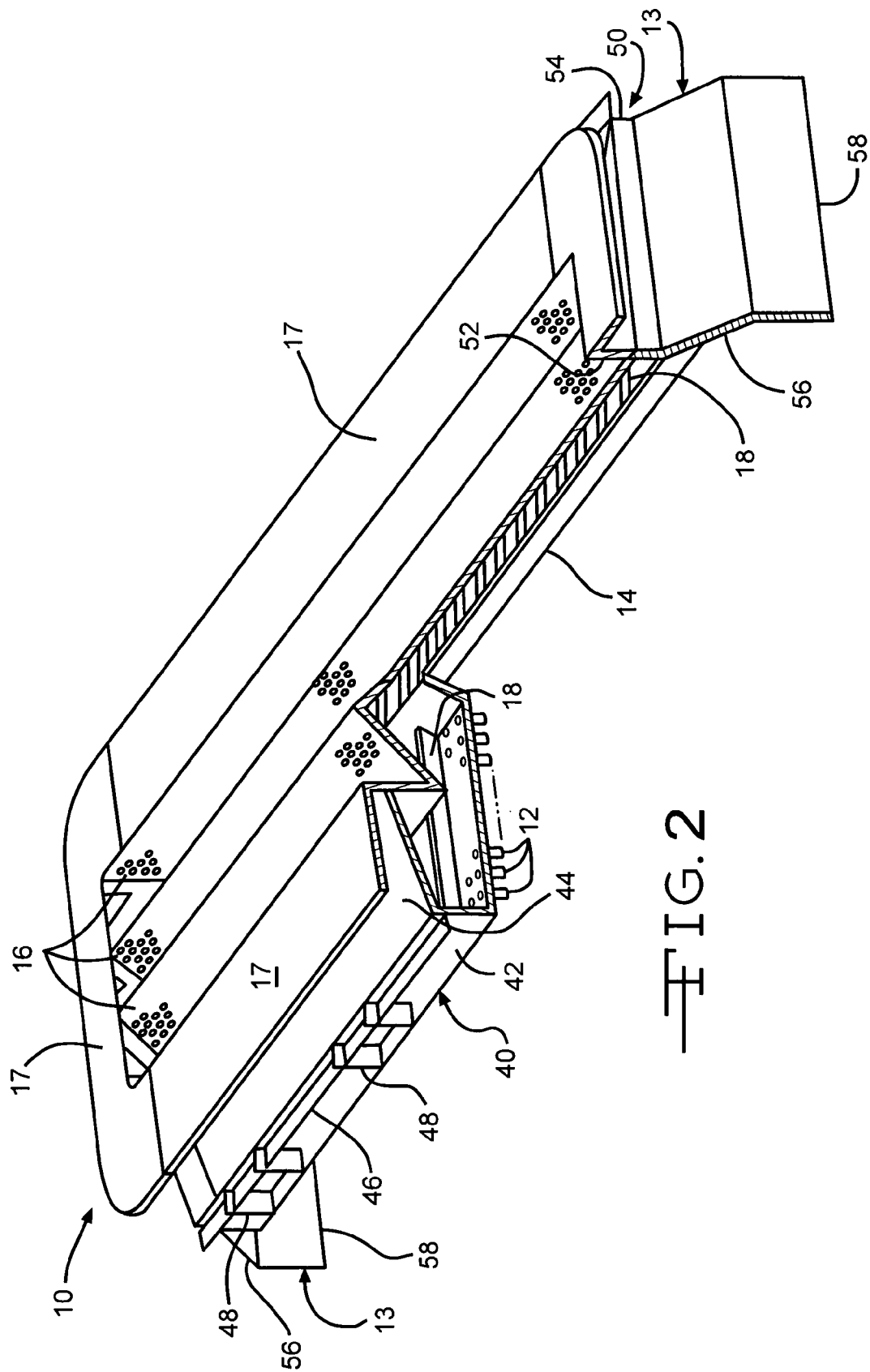
FIG. 2 is a schematic perspective view, partially broken away, of a bushing assembly.

In the embodiment shown in FIG. 2, the bushing assembly 10 generally includes a perforated bottom tip plate 14 and a screen 16 through which molten glass flows. The tip plate 14 may be referred to as a nozzle plate. In certain embodiments, a plurality of nozzles or tips 12 extends from a bottom surface of the perforated bottom tip plate 14. The perforated bottom tip plate 14 may include any number of nozzles, preferably all at or close to a uniform temperature. Also, while the screen 16 is shown as having a generally V- or W-shaped cross-section, it should be appreciated that the screen can have other suitable cross-sectional shapes, for example, a W shape, or other slanted or oriented folds, and the like.

Filaments 20 of glass are attenuated from molten glass coming through the nozzles 12. The filaments 20 are drawn from the bushing assembly 10 and are gathered into a strand 22 by a gathering member 23. Size is applied to coat the filaments 20 by a size applicator 26. A reciprocating device 32 guides the strand 22, which is wound around a rotating collet 34 to form a package 36.

Also, in certain embodiments, the bushing assembly 10 includes one or more reinforcing members 18, also called tip plate gussets, attached to an upper surface of the tip plate 14 to provide additional support to the tip plate 14 and to prevent premature sagging of the tip plate 14. As shown in FIG. 2, the gussets 18 extend width-wise across the upper surface of the tip plate 14 at spaced intervals.

The bushing assembly 10 generally has a rectangular body with opposing side walls 40 and opposing end walls 50. Also, the sidewalls 40 and 50 can have one or more flanges 17 that extend therefrom, as shown in FIG. 2.

Each side wall 40 has a lower portion 42 that is adjacent to the perforated tip plate 14. Each side wall 40 also has an upper sidewall portion 44 that is adjacent to the lower portion 42 and adjacent to the screen 16. In the embodiment shown, the upper sidewall portion 44 is a slanted sidewall. In certain embodiments, the side wall 40 can include one or more support rails 46 and support brackets 48 that aid in securing the bushing assembly 10 to a frame (not shown) within the fiber forming apparatus 5.

In the embodiment shown, each end wall 50 has a lower portion 54 that is adjacent to the perforated tip plate 14. Each end wall 50 also has an upper sidewall portion 52 that is adjacent to the lower portion 54 and adjacent to the screen 16.

In certain embodiments, at least the lower portion 54 is adjacent to the terminal ear 13. In the embodiment shown, the terminal ear 13 includes an upper ear portion 56 and a lower ear portion 58.

In use, the bushing assembly 10 conditions the molten glass to a uniform temperature so that the filaments are attenuated with uniform diameters. The temperature of the molten glass must be high enough to maintain the glass in a liquid state. Accordingly, the bushings are subjected to high temperatures over their operating life. The bushing assembly 10 must also be chemically resistant to the molten glass and must be dimensionally stable. In particular, during the useful life of a bushing, the bending stresses created by gravity, fiber tension and the weight of the molten glass and the elevated temperature cause the tip plate 14 to sag. The sagging reduces the effectiveness of the tip plate 14, since it results in a non-uniform thermal distribution within the bushing assembly 10 and therefore, the creation of fibers of non-uniform diameters due to uneven heat transfer. Also, recently, in order to supply increasing numbers of filaments to the winding apparatus, the bushings have increased in size. The larger bushings, however, encounter several problems due to their size. It is difficult to maintain the tip plate of a large bushing at a uniform temperature and still achieve uniform diameter filaments. Also, it is difficult to minimize and control the distortion of the tip plate due to high operating temperatures and the weight of the molten glass in the bushing above the plate. Larger tip plates are subjected to a greater overall load and tend to sag or creep sooner than smaller tip plates. Hotter operating temperatures in the current state of the art processes also accelerate the high temperature creep of the tip plate alloys. These problems result in creep and distortion of the tip plate, which limit the useful life of a bushing. Creep is the deformation of the tip plate under a load and is a function of temperature and the stress on the plate. Distortion results when an insufficient allowance is made for the thermal expansion of the plate when the temperature in the bushing increases.

The dimensional stability of the bushing, particularly in respect to creep rate, is of particular significance since any deformation of the bushing results in improper heat distribution across the orifice-containing tip plate 14 of the bushing assembly 10, misalignment of the orifices and enlargement of the orifices through which the molten mineral material is withdrawn. It is also desired that at least the portions of the bushing assembly that come into direct contact with the molten glass be able to withstand the corrosive effects of the molten glass. Pt is a useful material due to its resistance to oxidation and to corrosion by the molten glass. Pt alloys are resistant to creep at elevated temperatures as well. However, pure Pt is soft and quickly distorts at high temperatures and recent developments in the technology of glass fiberizing are approaching the limits of strength that can be achieved in the Pt group metals by conventional solid solution strengthening.

There has now been developed a bushing assembly in which the creep-resistance properties of each portion of the assembly have been tailored to meet specific structural demands, while also being resistant to glass corrosion and oxidation. Such bushing assembly 10 has structural components and non-structural components, each with unique properties. In particular, there has now been developed a bushing assembly that includes a high palladium content screen that meets the desired screen performance requirements, but which is advantageously lower in cost.

The structural components of the bushing assembly 10 are formed of a first material that has both desirable high creep strength and anti-corrosive properties. The structural components generally include at least the lower portion 42 of the sidewalls 40 and the perforated bottom tip plate 14, and, when present, the nozzles 12. In certain embodiments, when the bushing assembly 10 further includes the gussets 18, the support rails 46 and/or the support brackets 48, the side rails 46 and/or brackets 46 can also be considered to be structural components, and as such, made of the first material.

In certain embodiments, the first material can comprise a Pt material, a Pt alloy, or a dispersion-strengthened Pt alloy. In a particular embodiment, the first material Pt alloy can comprise a Pt—Rh alloy. Also, in a particular embodiment, the dispersion-strengthened Pt alloy can be as described in the U.S. Pat. No. 4,274,852 to McGarry, which is expressly incorporated herein by reference. Suitable examples of dispersion-strengthened Pt alloys can include Pt as the dispersing medium, or matrix, and a dispersoid of a metal oxide, metal carbide, metal silicide, metal nitride, metal sulfide or a metal boride, which dispersoid is present in effective dispersion strengthening amounts. Usually such amounts will be between about 0.1 percent to about 5 percent (by volume). In certain embodiments, the dispersoid will be an oxide. Exemplary of metal compounds, which may be employed as the dispersoid, are compounds of metals of Group IIA, IIIA, IIIB (including non-hazardous metals of the Actinide and Lanthanide classes), IVB, VB, VIB and VIIB. More specifically, exemplary of suitable metals are the following: Be, Mg, Ca, Ba, Y, La, Ti, Zr, Hf, Mo, W, Ce, Nd, Gd, and Th as well as Al. Also, the dispersion strengthened alloy can include a Pt alloy in which the dispersoid is zirconia; the latter can be present in an amount of about 0.5% by volume.

Methods for manufacturing the dispersion strengthened precious metal, or alloys of a precious metal, are well known in the art and include not only wet chemistry techniques but also powder metallurgy techniques and are commercially available from several sources.

The non-structural components of the bushing assembly 10 are formed of at least a second material that is different from the first material. The non-structural components can be made of any desirable second material that has anti-corrosive properties, but that does not require the high-creep strength properties of the first material that is used for the structural components.

The non-structural components generally include the flanges 17, the upper side wall portions 44 of the side walls 40, and at least the upper portions 52 of the end walls 50. In certain embodiments, the second material comprises about 0 to about 100% Pd, about 0 to about 100% Pt, about 40% or less Rh, about 10% or less Ru, and about 10% or less Ir. For example, in one embodiment, the second material comprises about 40 to about 50% Pd, about 40 to about 50% Pt, and about 5 to about 15% Rh. In certain other embodiments, the second material comprises about 45 to about 50% Pd, about 45 to about 50% Pt, and about 5 to about 15% Rh. In a particular embodiment, the second material comprises about 40% Pd, about 50% Pt, and about 10% Rh.

The screen 16 is comprised of a third material that is a high palladium content material. In certain embodiments, the screen comprises about 100% Pd. In another embodiment, the screen comprises about 85 to about 100% Pd, about 0 to about 15% Pt, about 0% to about 15% Ir, and about 0% to about 15% Rh.

In yet another embodiment, the screen comprises about 90 to about 100% Pd, about 0 to about 10% Pt, about 0% to about 10% Ir, and about 0% to about 10% Rh. In another embodiment, the screen comprises about 90 to about 100% Pd, about 0 to about 10% Pt, about 0% to about 10% Ir, and about 0% to about 10% Rh.

In still another embodiment, the screen comprises about 95 to about 100% Pd, about 0 to about 50% Pt, about 0% to about 5% Ir, and about 0% to about 5% Rh.

Also, in certain embodiments, the terminal ears 13 can be considered to be included as one of the non-structural components of the bushing assembly 10. In a particular embodiment, the non-structural components further include one or more terminal ears 13 and at least the lower portions 54 of the end plates 50.

In addition, in certain embodiments, the terminal ears 13 (including, for example, the upper ear portion 56 and the lower ear portion 58) and the lower portion 54 of the end plate 50 can be made of a fourth material that is different from the first, second and third materials. The fourth material can be made of a mid-strength material that still provides at least some of the desired high-strength and anti-corrosive properties, but does not have the same high costs as the first material. In certain embodiments, such fourth, mid-strength material can comprise an alloy material having about 10% or less Rh. In certain embodiments, the Rh alloy includes 40 to about 50% Pd, and about 40 to about 50% Pt, and about 10% or less Rh.

In another aspect, a method of forming glass filaments to afford long trouble free service is provided. The method generally includes providing molten glass within a bushing having structural components and non-structural components. The molten glass is passed through the perforated tip plate to form streams of glass; and the glass streams flowing through the perforated tip plate are attenuated to form glass filaments.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

What is claimed is:

1. A filament forming apparatus having a bushing assembly through which a molten mineral material flows, the bushing assembly being comprised of components including a perforated bottom tip plate, opposing sidewalls, opposing end plates, and a screen positioned adjacent to the sidewalls and the end walls through which molten mineral material flows, the bushing assembly components being comprised of at least one structural component and at least one non-structural component;

the structural components including the perforated bottom tip plate, and optionally, at least lower portions of the opposing sidewalls, the structural components being formed of a first material having a high creep strength;

the non-structural components, including at least an upper portion of the sidewalls, being formed of at least a second material that has a lower creep strength than the first material, and the screen being formed of a third material comprising a high palladium content material.

2. The filament forming apparatus of claim 1, wherein the first material further has a higher ability to withstand corrosive effects of the molten mineral material than the second material and the third material.

3. The filament forming apparatus of claim 1, wherein the third material comprises about 100% Pd.

4. The filament forming apparatus of claim 1, wherein the third material comprises about 85 to about 100% Pd, about 0 to about 15% Pt, about 0% to about 15% Ir, and about 0% to about 15% Rh.

5. The filament forming apparatus of claim 1, wherein the second material comprises about 0 to about 100% Pd, about 0 to about 100% Pt, about 40% or less Rh, about 10% or less Ru, and about 10% or less Ir.

6. The filament forming apparatus of claim 1, wherein the second material comprises about 40 to about 50% Pd, about 40 to about 50% Pt and about 5 to about 15% Rh.

7. The filament forming apparatus of claim 1, wherein the second material comprises about 40% Pd, about 50% Pt and about 10% Rh.

8. The filament forming apparatus of claim 1, wherein the first material comprises Pt, a Pt alloy, or a dispersion-strengthened Pt alloy.

9. The filament forming apparatus of claim 1, wherein the first material comprises a Pt—Rh alloy.

10. The filament forming apparatus of claim 1, wherein the structural components further include one or more reinforcement members attached to an upper surface of the perforated bottom tip plate.

11. The filament forming apparatus of claim 1, wherein the structural components further include one or more reinforcement members attached to an outer surface of the sidewalls.

12. The filament forming apparatus of claim 1, wherein the structural components further include a plurality of nozzles extending from a bottom surface of the perforated bottom tip plate.

13. The filament forming apparatus of claim 1, wherein the non-structural components further include one or more flanges extending from the upper portions of the sidewalls and at least portions of opposing end plates.

14. The filament forming apparatus of claim 1, wherein the bushing assembly further includes opposing terminal ears adjacent to the end walls, and wherein the non-structural components further include the opposing terminal ears and at least portions of the opposing end plates.

15. The filament forming apparatus of claim 1, wherein the bushing assembly further includes opposing terminal ears adjacent to the end walls, wherein the non-structural components further include the opposing terminal ears and at least lower portions of the end plates are comprised of a fourth material that is different from the first, second and third materials.

16. The filament forming apparatus of claim 15, wherein the fourth material comprises about 10% or less Rh.

17. A method of forming mineral filaments comprising the steps of:
a) providing molten mineral material within a bushing of a filament forming apparatus
b) passing the molten mineral material through the perforated tip plate to form streams of material; and,
c) attenuating the streams flowing through the perforated tip plate to form filaments.
wherein the filament forming apparatus comprises:
a perforated bottom tip plate, opposing sidewalls, opposing end plates, and a screen positioned adjacent to the sidewalls and the end walls through which molten mineral material flows, the bushing assembly components being comprised of at least one structural component and at least one non-structural component;
the structural components including the perforated bottom tip plate, and optionally, at least lower portions of the opposing sidewalls, the structural components being formed of a first material having a high creep strength;
the non-structural components, including at least an upper portion of the sidewalls, being formed of at least a second material that has a lower creep strength than the first material, and
the screen being formed of a third material comprising a high palladium content material.

18. The method of claim 17, wherein the first material further has a higher ability to withstand corrosive effects of molten mineral material than the second material and the third material.

19. The method of claim 17, wherein the third material comprises about 100% Pd.

20. The method of claim 17, wherein the third material comprises about 85 to about 100% Pd, about 0 to about 15% Pt, about 0% to about 15% Ir, and about 0% to about 15% Rh.

21. The method of claim 17, wherein the second material comprises about 0 to about 100% Pd, about 0 to about 100% Pt, about 40% or less Rh, about 10% or less Ru, and about 10% or less Ir.

22. The method of claim 17, wherein the second material comprises about 40 to about 50% Pd, about 40 to about 50% Pt and about 5 to about 15% Rh.

23. The method of claim 17, wherein the second material comprises about 40% Pd, about 50% Pt and about 10% Rh.

24. The method of claim 17, wherein the first material comprises Pt, a Pt alloy, or a dispersion-strengthened Pt alloy.

25. The method of claim 17, wherein the first material comprises a Pt—Rh alloy.

26. The method of claim 17, wherein the structural components further include one or more reinforcement members attached to an upper surface of the perforated bottom tip plate.

27. The method of claim 17, wherein the structural components further include one or more reinforcement members attached to an outer surface of the sidewalls.

28. The method of claim 17, wherein the structural components further include a plurality of nozzles extending from a bottom surface of the perforated bottom tip plate.

29. The method of claim 17, wherein the non-structural components further include one or more flanges extending from the upper portions of the sidewalls and at least portions of opposing end plates.

30. The method of claim 17, wherein the bushing assembly further includes opposing terminal ears adjacent to the end walls, and wherein the non-structural components further include the opposing terminal ears and at least portions of the opposing end plates.

31. The method of claim 17, wherein the bushing assembly further includes opposing terminal ears adjacent to the end walls, wherein the non-structural components further include the opposing terminal ears and at least portions of the opposing end plate, and wherein the terminal ears and at least lower portions of the end plates are comprised of a fourth material that is different from the first, second and third materials.

32. The method of claim 31, wherein the fourth material comprises about 10% or less Rh.

33. A filament forming apparatus having a bushing assembly through which a molten mineral material flows, the bushing assembly being comprised of components including a perforated bottom tip plate, opposing sidewalls, opposing end plates, and a screen positioned adjacent to the sidewalls and the end walls through which molten mineral material flows, the bushing assembly components being comprised of at least one structural component and at least one non-structural component;
the structural components including the perforated bottom tip plate, and optionally, at least lower portions of the opposing sidewalls, the structural components being formed of a first material having a high creep strength;
the non-structural components, including at least an upper portion of the sidewalls, being formed of at least a second material that has a lower creep strength than the first material, wherein the second material comprises about 40% to about 50% Pd, about 40% to about 50% Pt and about 5% to about 15% Rh, and
wherein the screen being formed of a third material comprising a high palladium content material.

34. The filament forming apparatus of claim 33, wherein the first material further has a higher ability to withstand corrosive effects of the molten mineral material than the second material and the third material.

35. The filament forming apparatus of claim 33, wherein the third material comprises about 85 to about 100% Pd, about 0 to about 15% Pt, about 0% to about 15% Ir, and about 0% to about 15% Rh.

36. The filament forming apparatus of claim 33, wherein the first material comprises Pt, a Pt alloy, or a dispersion-strengthened Pt alloy.

37. The filament forming apparatus of claim 33, wherein the structural components further include one or more reinforcement members attached to an upper surface of the perforated bottom tip plate.

38. The filament forming apparatus of claim 33, wherein the structural components further include one or more reinforcement members attached to an outer surface of the sidewalls.

39. The filament forming apparatus of claim 33, wherein the structural components further include a plurality of nozzles extending from a bottom surface of the perforated bottom tip plate.

40. The filament forming apparatus of claim 33, wherein the non-structural components further include one or more flanges extending from the upper portions of the sidewalls and at least portions of opposing end plates.

41. The filament forming apparatus of claim 33, wherein the bushing assembly further includes opposing terminal ears adjacent to the end walls, and wherein the non-structural components further include the opposing terminal ears and at least portions of the opposing end plates.

42. A filament forming apparatus having a bushing assembly through which a molten mineral material flows, the bushing assembly being comprised of components including a perforated bottom tip plate, opposing sidewalls, opposing end plates, and a screen positioned adjacent to the sidewalls and the end walls through which molten mineral material flows, the bushing assembly components being comprised of at least one structural component and at least one non-structural component;
    the structural components including the perforated bottom tip plate, and optionally, at least lower portions of the opposing sidewalls, the structural components being formed of a first material having a high creep strength;
    the non-structural components, including at least an upper portion of the sidewalls, being formed of at least a second material that has a lower creep strength than the first material,
    the screen being formed of a third material comprising a high palladium content material, and
    wherein the bushing assembly further includes opposing terminal ears adjacent to the end walls, wherein the non-structural components further include the opposing terminal ears and at least portions of the opposing end plate, and
    wherein the terminal ears and at least lower portions of the end plates are comprised of a fourth material that is different from the first, second and third materials.

43. The filament forming apparatus of claim 41, wherein the fourth material comprises about 10% or less Rh.

44. The filament forming apparatus of claim 41, wherein the first material further has a higher ability to withstand corrosive effects of the molten mineral material than the second material and the third material.

45. The filament forming apparatus of claim 41, wherein the third material comprises about 85 to about 100% Pd, about 0 to about 15% Pt, about 0% to about 15% Ir, and about 0% to about 15% Rh.

46. The filament forming apparatus of claim 41, wherein the second material comprises about 0 to about 100% Pd, about 0 to about 100% Pt, about 40% or less Rh, about 10% or less Ru, and about 10% or less Ir.

47. The filament forming apparatus of claim 41, wherein the second material comprises about 40 to about 50% Pd, about 40 to about 50% Pt and about 5 to about 15% Rh.

48. The filament forming apparatus of claim 41, wherein the first material comprises Pt, a Pt alloy, or a dispersion-strengthened Pt alloy.

49. The filament forming apparatus of claim 41, wherein the structural components further include one or more reinforcement members attached to an upper surface of the perforated bottom tip plate.

50. The filament forming apparatus of claim 41, wherein the structural components further include one or more reinforcement members attached to an outer surface of the sidewalls.

51. The filament forming apparatus of claim 41, wherein the structural components further include a plurality of nozzles extending from a bottom surface of the perforated bottom tip plate.

52. The filament forming apparatus of claim 41, wherein the non-structural components further include one or more flanges extending from the upper portions of the sidewalls and at least portions of opposing end plates.

53. The filament forming apparatus of claim 41, wherein the bushing assembly further includes opposing terminal ears adjacent to the end walls, and wherein the non-structural components further include the opposing terminal ears and at least portions of the opposing end plates.

* * * * *